United States Patent [19]

Thomas

[11] Patent Number: 4,752,387
[45] Date of Patent: Jun. 21, 1988

[54] METHOD AND MEANS FOR INSTALLING A BY-PASS FILTER

[76] Inventor: Albert E. Thomas, 7241 Enfield Ave., Reseda, Calif. 91335

[21] Appl. No.: 95,595

[22] Filed: Sep. 14, 1987

[51] Int. Cl.⁴ .......................... B01D 27/10; F01M 1/00
[52] U.S. Cl. ................................ 210/168; 123/196 A; 210/232; 210/416.5
[58] Field of Search ................... 123/196 A; 137/318; 210/168, 232, 416.5, DIG. 17

[56] References Cited

U.S. PATENT DOCUMENTS

| | | | |
|---|---|---|---|
| 3,981,322 | 9/1976 | Gebelius | 137/318 |
| 4,140,155 | 2/1979 | Tannery | 137/318 |
| 4,406,784 | 9/1983 | Cochran | 210/416.5 X |
| 4,452,695 | 6/1984 | Schmidt | 210/168 |
| 4,561,395 | 12/1985 | McMullen | 210/168 X |
| 4,638,834 | 1/1987 | Montgomery | 137/318 X |
| 4,672,932 | 6/1987 | Schmidt | 210/168 X |
| 4,700,670 | 10/1987 | Schade | 210/168 X |

Primary Examiner—Robert Spitzer

[57] ABSTRACT

Adapter for connecting a by-pass oil filter to an internal combustion engine equipped with a full-flow, throwaway, replaceable oil filter. Adapter would form an adjustable clamp band around the annular surface of the full-flow filter and would embody an appropriate penetrating device consisting of a sharpened hollow needle or penetrating pin which would automatically penetrate the annular surface of the full-flow filter when the adapter band is securely tightened, opening up access to a small supply of engine oil to be transferred to the by-pass filter via appropriate connections.

9 Claims, 3 Drawing Sheets

METHOD AND MEANS FOR INSTALLING A BY-PASS FILTER

This invention relates to oil filter systems in a mechanism requiring a high pressure lubricant (usually about 45 lb. per sq. in.) to lubricate the bearings and other sliding parts therein. The invention applies to any machine requiring high pressure lubrication, but finds its particular application in the internal combustion engines of the type used to power an automobile, bus, tractor, etc. In such engine it is conventional to employ an engine driven high pressure lubricant pump delivering first to a high performance full flow filter, and from there to the bearings, the passage of the lubricant through the filter causing a relatively small pressure drop.

The higher quality full flow filters remove all particles above 30 microns, while the lower quality filters remove all particles above 40 microns.

However, even 20 micron particles in the oil will score the surfaces of closely fitted bearings and other relatively movable parts, and materially shorten the life of the engine. Frequent lubricant and filter changing will minimize this effect, but will not eradicate it, and such procedure is both costly and inconvenient.

It has been proposed to install, in addition to the full flow filter, a by-pass filter which will filter all particles above 0.1 micron. Such by-pass filter handles a relatively small flow, but is continuously acting so that virtually all particles above 1/10 (or sometimes 1) microns are removed. Particles of this small size remaining (1 to 1/10 microns) readily pass between the bearing and journal of an automobile, or other engine, with the oil, and will merely float in the oil and not scour or abrade the surfaces. This elimination of abrasion will double the life expectancy of an engine in some cases and materially lengthen the engine life in all cases.

However, it is usually difficult to obtain oil under pressure from a modern automobile engine. There are, at present, three principal ways to obtain this oil:

1. "Teeing off" an oil pressure sending unit, which consists in unscrewing the unit from its threaded post, installing a "T" fitting, the straight branch going to the re-installed unit, the side branch to the bypass filter. In at least 90% of the cases, this is impractical because (a) most sender switches are virtually inaccessable for removal and reinstallation, and (b) the oil under pressure from this source is taken from the oil gallery (or discharge side of the full flow filter) thus throwing an additional load on that filter and at the same time dropping the oil gallery pressure by a small amount—2 to 3 p.s.i.

2. Removal of an oil gallery plug for the pressure source of oil for the by-pass filter. This plug is also not readily accessable, and drops the oil pressure to the bearings, as in "1" above.

3. Installing a special adaptor plate (see U.S. Pat. No. 4,406,784 to Cochran, element 10) between the spin-on, full flow filter and the engine filter mounting boss. The adaptor is equipped with a threaded opening to afford access to the oil under pressure. The adaptor plate entails, at present, the stocking of nine adaptor plate retainer nuts of different thread sizes and configurations and five adaptor plates. Even with this elaborate and expensive array, only about 80% of the vehicles on the market can be fitted. However, when fitted, the adaptor plate is reliable and effective.

In "3" above, the oil pressure is obtained directly from the engine oil pump side of the full flow filter media, thereby not reducing the oil pressure in the oil galleries, or adding additional oil filtration volume to the full flow filter media.

The purpose of this invention is to provide an oil pressure take-off directly from the body of the spin-on full flow filter as regularly supplied to the trade, the pressure oil then being transmitted to the by-pass filter, and thence to the engine oil sump. Thus there is no overloading of the full flow media, or loss of pressure in the oil galleries (or the bearings). Also, the take-off of the invention is economical, fits virtually every full flow filter now on the market, requires only one design, in one embodiment to fit all filters (or two designs, in a second embodiment to fit all full flow filters), is very reliable, readily and conveniently installed or removed and installed on a further replacement filter, and can be conveniently oriented on the filter to accomodate the best routing of the oil line to the by-pass filter.

This purpose is achieved by a suitable peripherally adjustable (in one embodiment) clamp band, with a tightening means, which carries a "tap," or alternatively, a saddle valve of appropriate size and design, which when properly installed on a spin-on replaceable full flow engine filter will afford a sealed opening into said filter through which oil under pressure could be directed to a by-pass filter, or, broadly, other uses.

In the drawings:

FIG. 4b is an end view of the unit of FIG. 4a.

FIG. 5b is an end view of the superior cutter.

Figure 1:
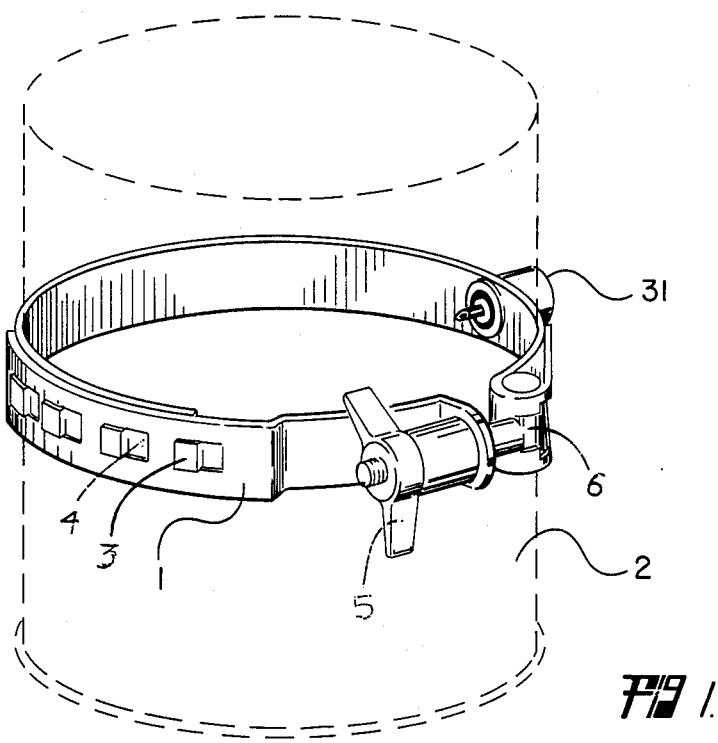
FIG. 1 shows a clamp band surrounding a full flow filter, with means to hold a penetrating take off against the side of the filter.
Figure 2:
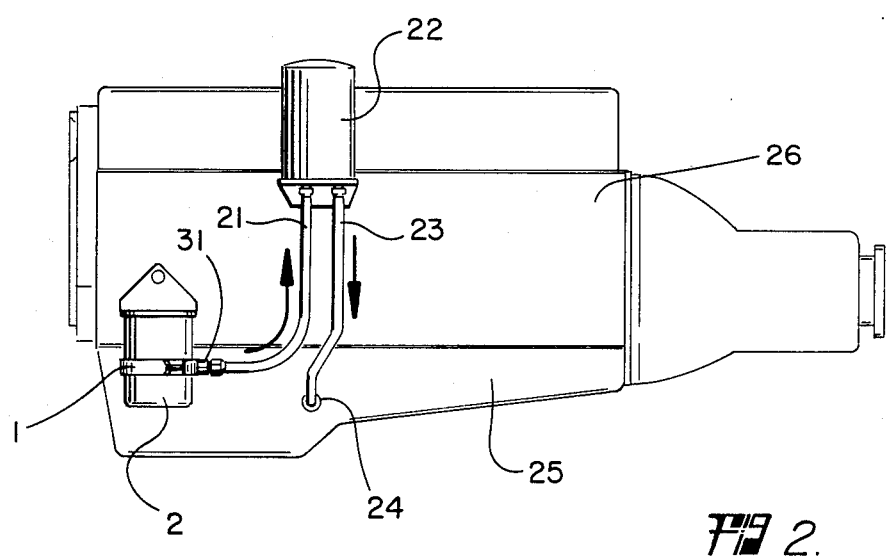
FIG. 2 shows the engine, a full flow filter therefor, the band and oil take-off, and a by-pass filter with the necessary oil conduits.
Figure 3:
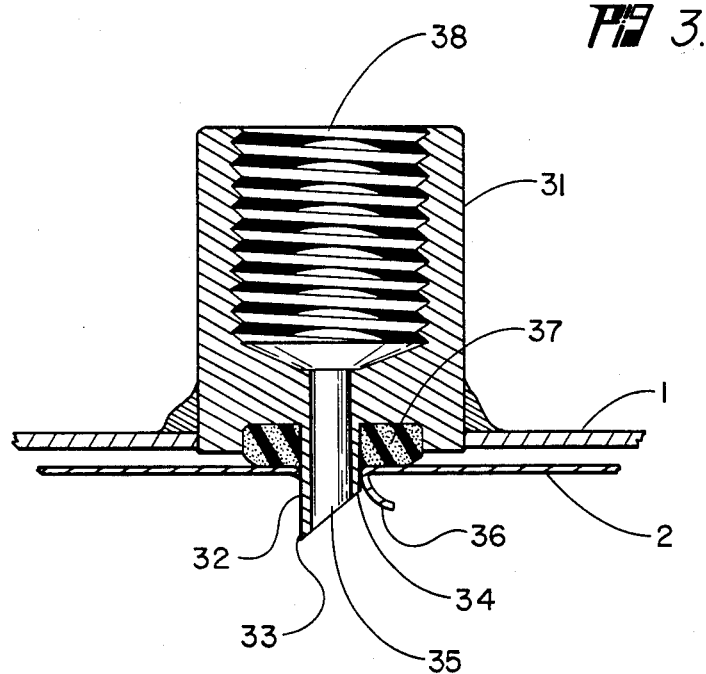
FIG. 3 is a cross-section of a self tapping device with the band, as applied to a full flow filter.

In FIGS. 1 and 2 the clamp band 1 surrounds full flow filter 2 of the type where the outside of the body carries the full pump pressure, the oil passing inwardly through the filtering media to the center, from whence it passes to the oil gallery and to the sliding parts of the engine. The band 1 carries a penetrating take off fitting 31, which by threads (shown in other Figs) connects to an oil line 21 leading to a by-pass filter 22, and from there to the engine oil sump 25 by oil line 23 and fitting 24.

The band 1 is shown as being adjustable in length, to fit any filter size now on the market, by means of selectively engageable hooks 3 and slots 4, combined with adjusting and tightening thumb nut 5 and T bolt 6 attached to the band as shown. Alternatively, the band could be in a single piece, wherein the thumb nut would make the entire adjustment. In this embodiment, two sizes of bands would accomodate any filter size on the present market. The self-tapping element 31 is shown attached to the side of full flow filter 2 by band 1, the element being threaded to attach a pressure oil hose.

The full flow filter 1 is attached and connected to the engine 26 in the manner provided by the engine maker. The by-pass filter 22 will be mounted by an installer in any suitable manner, such as "U" shaped bracket attached at any convenient place in the engine compartment. Fully filtered oil, containing no abrasive particles above 1 micron, or in some cases 1/10 micron, passes to the oil sump of the engine. By-pass filters of this type are well known, and may be as manufactured by the Frantz Oil Filter Col.

FIGS. 3, 4, 4a, 4b, 5, 5a and 5b show a self penetrating and oil tapping device in detail. The device includes a tube 32 of hardened material having an angular cutting tip 33 (or 33') and a heel 34 (or 34'). The device 31 also has threads 38 whereby the oil line 21 may be attached. The band 1 is secured to the body of device 31 in any desirable way, such as welding or brazing. A washer 37 seals the device against leakage of the pressure oil.

When the band 1 is placed around the filter 2 at the desired location, the thumb bolt 5 is tightened, which causes the tip 33 to press against the side wall of filter 1 and cut an opening in this wall, the curled cut out piece being shown at 36. When full tightened, the seal 37 presses firmly against the side wall so that no leakage occurs and the parts will have no further relative movement. When installing this band, the full flow filter must first be fully tightened on its seat, or other mounting means, and the outlet 31 then oriented both longitudinally and peripherally so that the oil line 21 may be conveniently attached and properly routed to the filter 22.

Figure 4A:
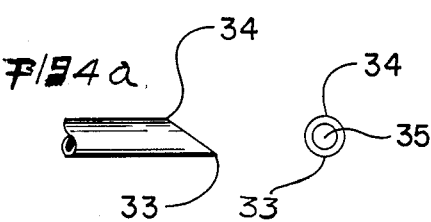
FIG. 4a is a side view of the cutting unit.
Figure 5A:
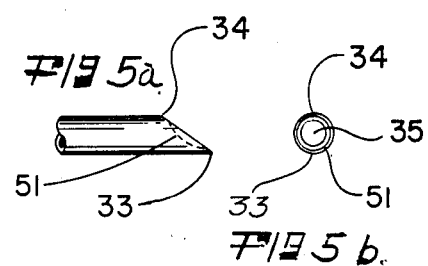
FIG. 5a is a side view of the superior cutter.
Figure 4:
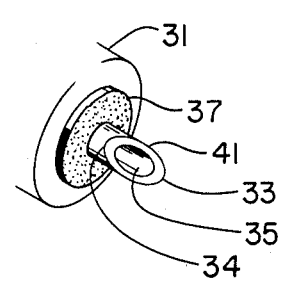
FIG. 4 is a perspective of one end of a self tapping unit.
Figure 5:
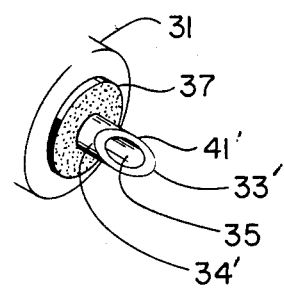
FIG. 5 is a persepctive view of one end of a superior cutter for a self tapping unit.

In FIGS. 4, 4a and 4b, the tube 32 is shown as having an elliptical cutting edge. In FIGS. 5, 5a and 5b, the tube is shown as having an elliptical cutting edge 41, with a recessed, ground surface 51. This latter cutter is somewhat sharper.

Figure 6:
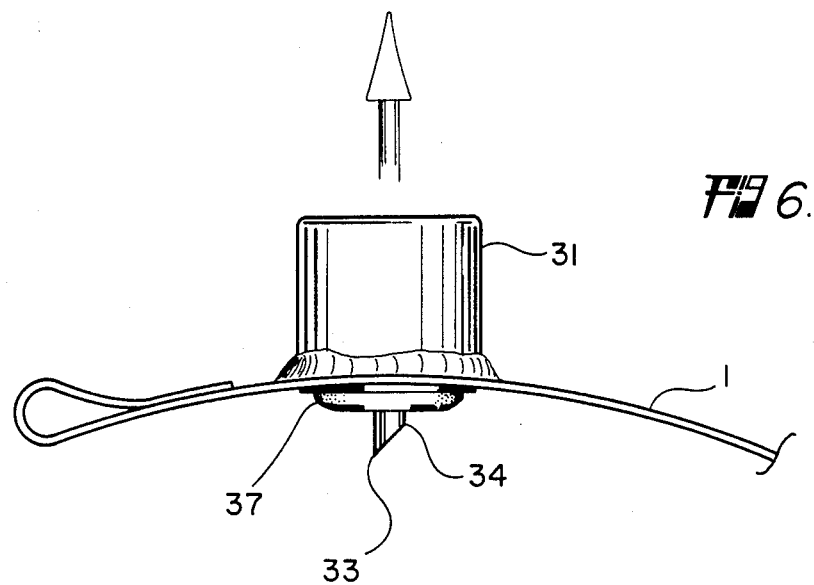
FIG. 6 is a side view of a tapping unit permanently attached to a band.

FIG. 6 is a side view of a penetrating device permanently attached to band 1.

Figure 7:
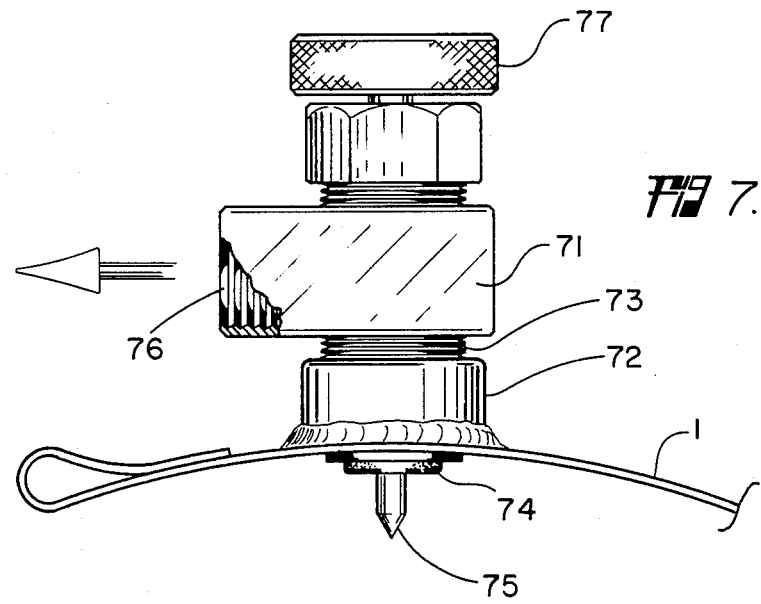
FIG. 7 is a side view of a tap of the type which includes an actuator for the cutter and also includes a valve.

FIG. 7 shows a representative tap valve with body 71, coupling 72 fixed to band 1, threads 73 mounting body 71, tip seal 74, piercing tip 75, threaded exit orifice 76 and valve operating wheel 77. This is a known tap valve and may be of the general type shown by Tannery in U.S. Pat. No. 4,140,155.

In this version the band is placed around the installed full flow filter with the needle 75 fully retracted. When properly oriented for the most convenient attachment and routing of outlet hose 21, the band is then fully tightened so that seal 74 firmly engages the side wall of the filter 2. The wheel 77 is then rotated so that the needle 75 moves downwardly to pierce the side wall of the filter 2 and establish communication with outlet 76 and hose 21.

Thus there is provided an oil take off device for a full flow filter, that does not impose an extra load on the filter media of that filter, does not reduce the oil pressure to the oil pressure galleries of the engine, is economical, may readily be attached to or disattached from any full flow filter on the market and permits placement of the take off element at any desired location on the filter for proper attachment and routing of the outlet hose. Also, at 50 lb. per sq. in. oil pressure (a higher pressure than most automobile engines) the clamp must supply only 10.2 oz. plus a desired sealing pressure against the filter side wall to be operative.

I claim:

1. In a filtering system for the lubricant of a machine having a lubricant pump connected directly to a full flow filter having an outer housing receiving said lubricant and passing it thence through a filter media, said system also having a by-pass filter having an inlet and an outlet; the improvement of an annular band surrounding and tightenable against said full flow filter, a pressure lubricant take off unit secured to said band and pressing against said full flow filter by the tightening effect of said band, said unit including a hollow needle penetrating said housing and conducting said lubricant to the exterior of said housing; said system including means to conduct said lubricant from said unit to said by-pass filter, and further means to conduct said lubricant from said by-pass filter to an area of lesser pressure than that produced by said pump.

2. The improvement of claim 1 wherein said needle has a sharpened edge whereby the needle cuts its way into the full flow filter.

3. The improvement of claim 2 wherein the face of the cutting portion of said needle is hollow ground to increase the sharpness of said edge.

4. The improvement of claim 1 wherein said unit has a sealing washer surrounding said needle and sealing said unit to said full flow filter.

5. The improvement of claim 1 wherein the needle of said unit is fixed to said unit.

6. The improvement of claim 1 wherein the needle of said unit is movable relatively to said unit by an external operating means, whereby the needle may be forced into said full flow filter after said band has been tightened.

7. A method of installing a by-pass lubricant filter for a machine having a high pressure lubricant pump and a means to install a full flow lubricant filter, comprising the steps of installing a full flow filter at said means in a tight and leakproof manner, mounting a lubricant by-pass filter having an inlet and an outlet in the vicinity of said full flow filter, passing a contractable band with a penetrating take-off having an outlet around said full flow filter, orienting said take-off on said full flow filter so that a hose may be routed from the outlet of the take-off to the inlet of the by-pass filter, contracting said band, penetrating the wall of said full flow filter by said take-off and sealing therewith, connecting a pressure hose between the outlet of said take-off and the inlet of said by-pass filter, and installing a means to conduct the filtered lubricant from the outlet of said by-pass filter to a region of low pressure in said machine.

8. The method of claim 7 wherein the direct force of the contracting band forces the penetrating take-off into the said wall.

9. The method of claim 7 wherein the direct force of the contracting band forces the take-off into sealing engagement with said wall, and the further step of penetrating the wall by the take-off by an external force.

* * * * *